Nov. 28, 1939.  W. BOLEY  2,181,544
BRAKE TESTING APPARATUS
Filed Nov. 14, 1938  4 Sheets-Sheet 1
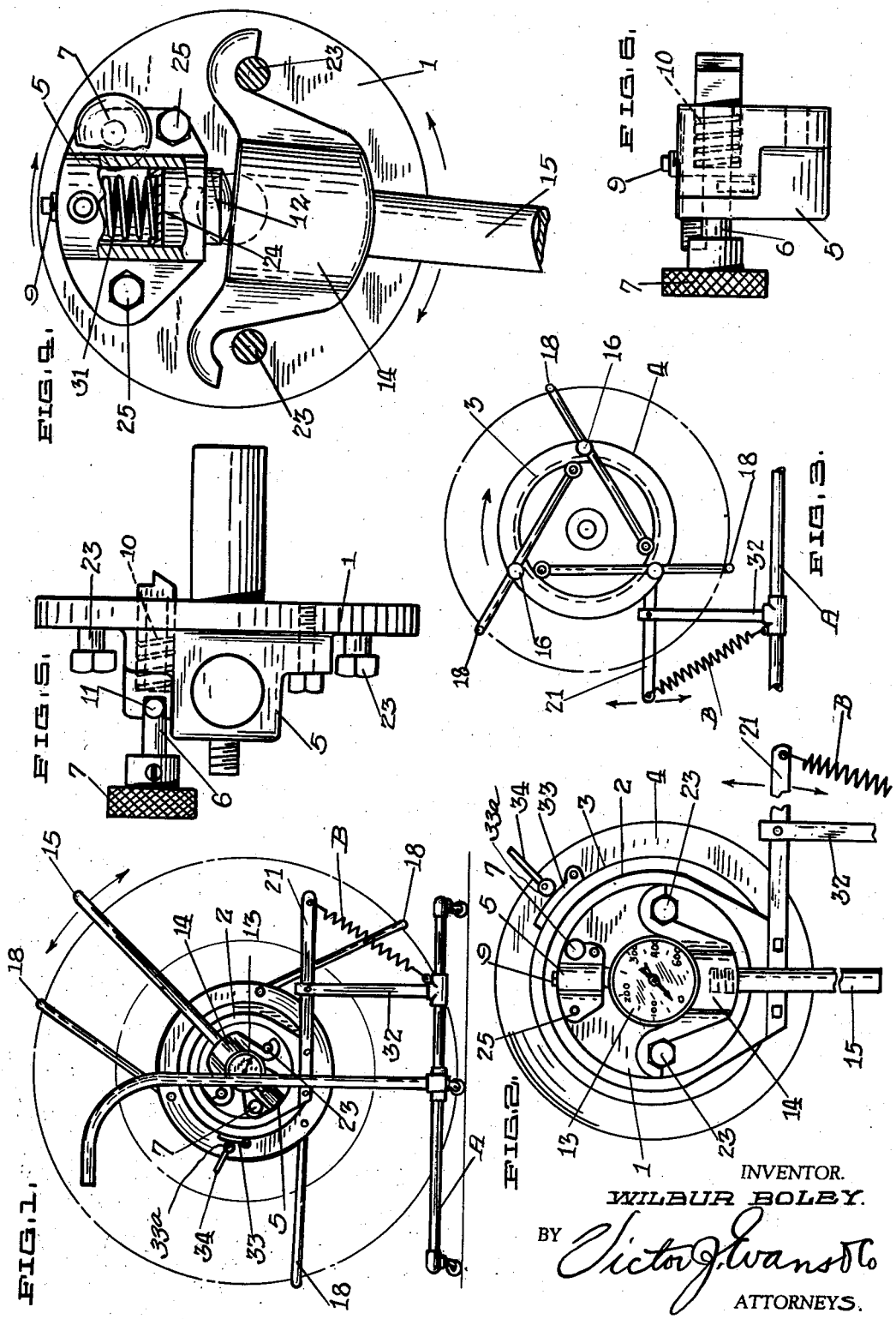
INVENTOR.
WILBUR BOLEY.
BY Victor J. Evans & Co
ATTORNEYS.

Nov. 28, 1939.  W. BOLEY  2,181,544
BRAKE TESTING APPARATUS
Filed Nov. 14, 1938  4 Sheets-Sheet 2
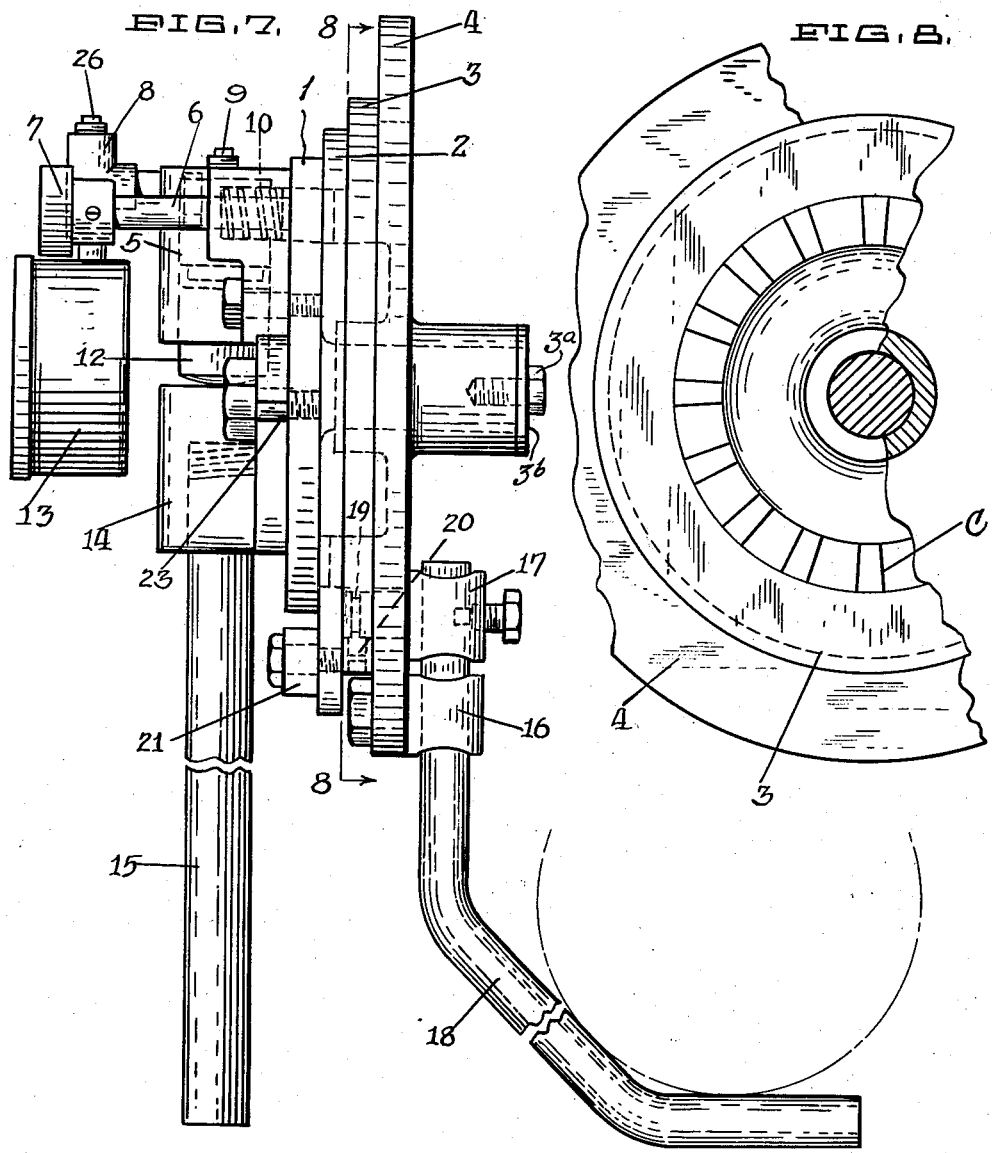
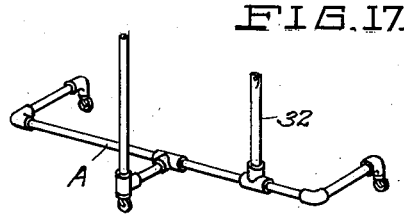
INVENTOR:-
WILBUR BOLEY.
BY Victor J. Evans & Co.
ATTORNEYS.

Nov. 28, 1939.  W. BOLEY  2,181,544
BRAKE TESTING APPARATUS
Filed Nov. 14, 1938  4 Sheets-Sheet 3
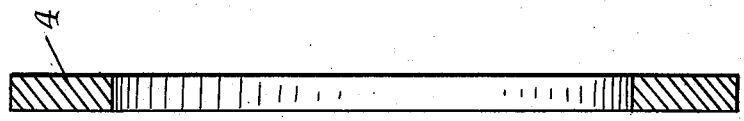
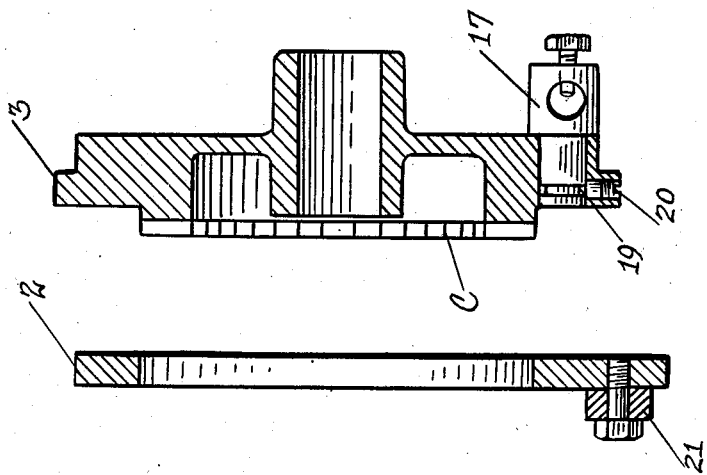
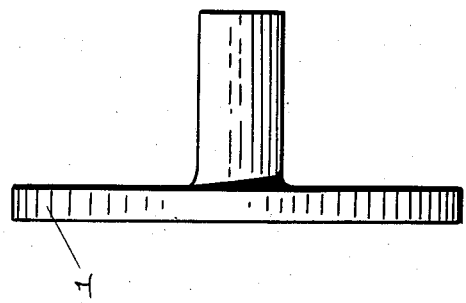
INVENTOR:
WILBUR BOLEY.
BY
ATTORNEYS.

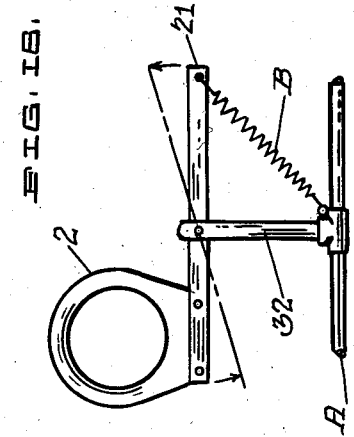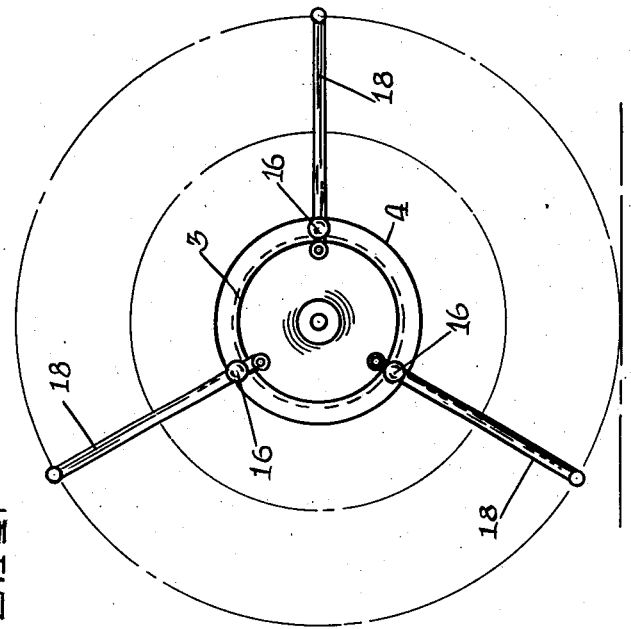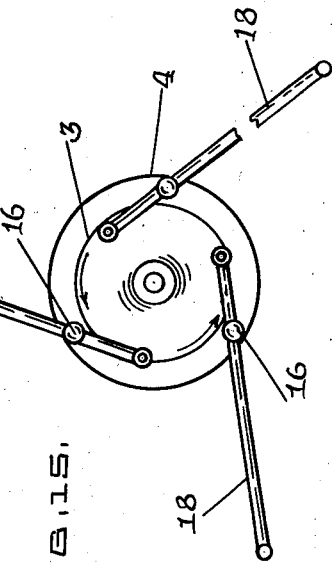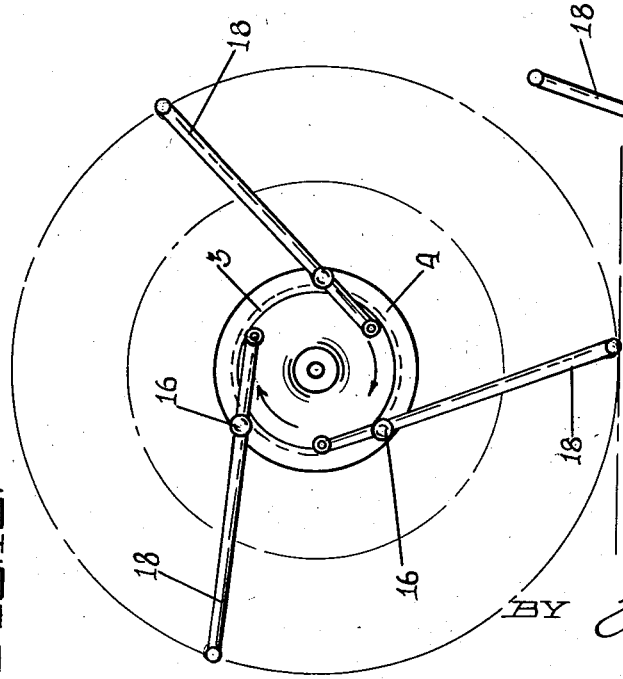

Patented Nov. 28, 1939

2,181,544

UNITED STATES PATENT OFFICE 2,181,544

BRAKE TESTING APPARATUS

Wilbur Boley, Seattle, Wash.

Application November 14, 1938, Serial No. 240,391

3 Claims. (Cl. 265—1)

This invention relates to improvements in devices for testing the equality of brakes in motor vehicles wherein two or more brakes may be equally adjusted by the use of the present testing apparatus as to ratio between one brake and another, or one set and another set of brakes.

The principal object of this invention is to provide an automatic brake testing device which may be applied to the outer contour of a wheel or tire which axially aligns an indicator, which indicator indicates the pressure applied to the brakes so that the same may be adjusted to determine the correct ratio between all the brakes upon the vehicle.

A further object of the invention is to produce a testing device of the character set forth that includes a testing unit having a carriage, whereby the testing unit may be readily moved toward and applied to the wheels of a motor vehicle.

A further object is to provide a device of this character which includes a mechanism for gripping the tires of the vehicle when in adjusted relation, whereby a gaged pressure may be applied to the brakes to indicate the proper and relative ratio between the various brakes of the vehicle so that a comparative ratio may be designated.

Other objects and advantages will be apparent during the course of the following description.

In the accompanying drawings forming a part of this specification and in which like numerals are employed to designate like parts throughout the same, Fig. 1 illustrates the improved device as connected to a vehicle wheel, which is shown in dotted and dash lines;

Fig. 2 is an enlarged front elevation of the device per se, showing the gage and other elements for accomplishing the objects set forth;

Fig. 3 is a rear elevation of a portion of the device, showing the various tire gripping elements in position thereon, portions thereof being broken away for the purpose of clearance of illustration;

Fig. 4 is a detailed view in elevation and partly in section, further illustrating the device and the means for actuating the same;

Fig. 5 is a plan detailed view illustrating one of the discs of the unit and including the ratchet mechanism;

Fig. 6 is a plan detailed view, further illustrating the ratchet mechanism of the device;

Fig. 7 is a greatly enlarged end elevation, showing the unit as a whole;

Fig. 8 is a fragmentary sectional elevation taken on the line 8—8 of Fig. 7 and further illustrating the ratchet mechanism of the device;

Fig. 9 is an elevation of a portion of the device;

Fig. 10 is a sectional view of the next successive element of the device;

Fig. 11 is a sectional view of an additional portion of the device including the ratchet mechanism;

Fig. 12 is a sectional detail of the operating disc of the device;

Fig. 13 is a diagrammatic view showing the position of the parts when the tire gripping arms of the device are partially opened;

Fig. 14 is a similar diagrammatic view showing the arms in full open positions;

Fig. 15 is still another diagrammatic view showing the position of the parts approximately half open in a reverse direction; and Fig. 16 is a detailed view of the spring actuated floating ring which supports the tester on the carriage of the device.

Fig. 17 is a perspective view of the carriage.

It is apparent that in applying the tester to the wheels of a motor vehicle the weight of the wheels and the body of the vehicle must be lifted from the ground by the use of a jack or other means at hand. It will also be noted that the brakes of the vehicle must be set in order to carry out the testing operation.

The device is mounted upon a carriage A which carries the testing elements and may be readily moved about, and the weight of the tester is partially counterbalanced by a spring B so that when the device is placed against the wheels or tires of a vehicle, it will automatically center itself, as disclosed in Figs. 1, 2, and 3.

The carriage A, as clearly illustrated in Fig. 17, comprises a length of pipe or the like, the ends of which have right angularly disposed horizontal sections terminating in fittings equipped with casters. Intermediate the ends, the pipe is provided with a similar section extending in the opposite direction relative to the other sections and which is also provided with a fitting to which is secured another caster. The last mentioned fitting has coupled thereto an upwardly extending section, the upper end of which is curved to form a handle whereby the carriage may be readily moved. The pipe is also provided with a coupling to which is connected the lower end of a support 32 for a purpose hereinafter more fully described.

The device consists of plates 1, 2, 3, and 4, as clearly shown in Figs. 7, 9, 10, 11, and 12. A fluid cylinder 5 is mounted upon the plate or driving disc 1, which cylinder is filled with a suitable fluid for operating the gauge, as will be hereinafter more fully described.

The plate or disc 4 receives therein the disc 3 which is formed with a hub and a circumferentially extending seat, the front face of the disc 3 being provided with ratchet teeth C adjacent said seat as clearly illustrated in Figure 11. The disc 2 is mounted on the seat of the disc 3 and about the teeth C while the rear face of the disc 1 engages the front face of the disc 2. The disc 1 is formed on the rear face thereof with a centrally disposed stub shaft, the latter being disposed within the hub of the disc 3 and having threaded in the end thereof a screw 3a which extends through a washer 3b engaging the rear end of the hub and coacting with the screw to secure the discs in assembled relation.

When the handle 15 of the device is swung in a clockwise direction, the yoke 14 rests on the right-hand pin 23, which action forces the piston 12 into the cylinder 5, against the rubber cup 24, which forces fluid into the gauge 13, thereby registering the pressure required to move the disc or plate 3 through the medium of the ratchet mechanism 6 which engages the teeth C formed in the disc or plate 3. (See Figs. 8 and 11.)

The operation above set forth rotates the plate 3, as indicated by the directional arrows, and draws all the arms 18 toward the center, causing said arms to tightly grip the tread of the tire, which gripping action is sufficiently tight so that the tire may be rotated against the brakes of the vehicle.

An eccentric element or cam 33a is mounted on the disc 4 for cooperation with a brake shoe 33 likewise mounted on the disc 4 for engagement with the peripheral face of the disc 3. The eccentric element 33a has connected thereto an actuating lever 34 whereby said cam element is operated to move the brake shoe into gripping relation with the disc 3. The gripping action thus obtained serves to maintain the grip on the tire so that the pressure on the tire will not be too great, nor will the device completely slacken when the pressure is released.

The assembly operates inside of the guide ring 4, in which ring are mounted the swivel guides 16, said guides being loosely fitted on each of the arms 18, said arms being pivoted at their ends, as shown, and tending to grip the tire tangentially when tightened, as shown in the various views.

The clockwise rotation of the unit would be for the adjustment of the wheel brakes running in the same direction and, of course, for the brakes on the right-hand side of the vehicle; and by pulling out and turning the ratchet pawl 6 a half turn a counterclockwise motion is obtained, likewise, when applied to the left-hand brakes of the vehicle.

In the rear views when the disc 3 is rotated in the opposite direction, the arms 18 will be opened to a maximum position and then may be closed in the opposite direction. The swivel fittings 17, which are mounted on the disc 3, have their inner ends grooved at 19 to receive a plug or pin 20 to hold the swivel fittings in place, said fittings also slightly overlap the outer ring 4 to prevent it from coming off the assembly.

The pawl shank 6 is provided with a pin 11 to hold the pawl in proper alignment, and the spring 10 urges the pawl into contact with the ratchet teeth C in the plate 3.

A spring 31 is also provided in the cylinder 5 to return the piston 12 and the gauge to zero setting, and the cylinder 5 is additionally provided with filling plugs 9 and 26 whereby fluid may be placed in said cylinder when required.

The floating ring 2 is supported on the carriage 10 A by means of the lever 21 and the support 32. Due to the action of the spring B, the said ring 2 automatically centers itself to fit various vehicle wheels.

It will thus be observed that I have provided a tester of the character disclosed that is positive in action, is comparatively simple in construction and operation, and may be readily applied to any motor vehicle wheel and adjusted to the tires thereof in a short period.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the class described capable of being applied to the wheels of a motor vehicle equipped with brakes, a testing unit having means connected therewith for automatically centering said unit relative to the hubs of said wheels, said means including a portable carriage and a spring controlled floating ring carried thereby carrying said unit, means carried by said unit for gripping a wheel, means carried by said unit for applying torque to the unit, and indicating means mounted on said unit whereby said torque may be registered to indicate the pressure applied thereto.

2. In a brake testing device of the class described comprising a portable carriage equipped with a floating ring, a testing unit mounted on said ring, said floating ring being capable of automatically centering itself relative to the hub of a wheel to be tested, gripping arms pivoted to said testing unit and capable of gripping the tread of the tire of said wheel, an actuating handle carried by said unit, and a fluid pressure actuated gauge carried by said unit whereby when rotational pressure is applied to said handle the gripping arms are actuated and said gauge indicates the pressure applied to said unit.

3. In a brake testing device of the class described comprising a portable carriage equipped with a spring balanced floating ring capable of automatically centering itself relative to the hub of the wheel to be tested, a testing unit mounted on said ring and including a plurality of discs, certain of said discs carrying a plurality of pivoted tire gripping arms, a yoke actuating handle carried by one of said discs and capable of rocking action thereon, a gauge operating cylinder mounted on said last mentioned disc and operable by said handle, and a pressure gauge connected to said cylinder whereby the rotational force applied to said handle is indicated by said gauge.

WILBUR BOLEY.